US012747361B2

(12) United States Patent
Turgis et al.

(10) Patent No.: US 12,747,361 B2
(45) Date of Patent: Sep. 29, 2026

(54) NON-STICK COATING

(71) Applicant: SEB S.A., Ecully (FR)

(72) Inventors: Raphaël Turgis, Ecully Cedex (FR); Isabelle Joutang, Ecully Cedex (FR); Stephanie Le Bris, Ecully Cedex (FR)

(73) Assignee: SEB S.A., Ecully (FR)

( * ) Notice: Subject to any disclaimer, the term of this patent is extended or adjusted under 35 U.S.C. 154(b) by 935 days.

(21) Appl. No.: 17/925,993

(22) PCT Filed: May 18, 2021

(86) PCT No.: PCT/FR2021/050880

§ 371 (c)(1),
(2) Date: Nov. 17, 2022

(87) PCT Pub. No.: WO2021/234286

PCT Pub. Date: Nov. 25, 2021

(65) Prior Publication Data

US 2023/0203324 A1 Jun. 29, 2023

(30) Foreign Application Priority Data

May 19, 2020 (FR) ....................................... 2005092

(51) Int. Cl.

| | |
|---|---|
| ***C09D 7/61*** | (2018.01) |
| ***B01J 23/22*** | (2006.01) |
| ***C01G 31/00*** | (2006.01) |
| ***C09D 5/00*** | (2006.01) |

(Continued)

(52) U.S. Cl.
CPC ................ *C09D 7/61* (2018.01); *B01J 23/22* (2013.01); *C01G 31/006* (2013.01); *C09D 5/002* (2013.01); *C09D 127/12* (2013.01); *C08K 3/22* (2013.01)

(58) Field of Classification Search
None
See application file for complete search history.

(56) References Cited

U.S. PATENT DOCUMENTS

| | | |
|---|---|---|
| 5,536,309 A | 7/1996 | Etzrodt et al. |
| 8,647,735 B2 | 2/2014 | Le Bris et al. |
| 2016/0160051 A1 | 6/2016 | Mutambi et al. |

(Continued)

FOREIGN PATENT DOCUMENTS

| | | |
|---|---|---|
| CN | 102008892 B | 12/2012 |
| CN | 106946289 A | 7/2017 |

(Continued)

OTHER PUBLICATIONS

CN-110338634-A—English translation (Year: 2019).*

(Continued)

*Primary Examiner* — Stefanie J Cohen
(74) *Attorney, Agent, or Firm* — Lerner David LLP

(57) ABSTRACT

The present invention relates to the use of (Bi1-xAx)(V1-yMy)O4 in a non-stick coating for a household article so as to catalyse the breakdown of the by-products resulting from said coating during the manufacturing process thereof or the use of said household article, characterised in that: x is 0 or x is from 0.001 to 0.999, y is 0 or y is from 0.001 to 0.999, A and M are selected from the group consisting of nitrogen, phosphorus, an alkali metal, an alkaline earth metal, a transition metal, a poor metal, a metalloid or a lanthanide, A and M are different from each other.

18 Claims, 1 Drawing Sheet

(51) Int. Cl.
*C09D 127/12* (2006.01)
*C08K 3/22* (2006.01)

(56) References Cited

U.S. PATENT DOCUMENTS

| | | | |
|---|---|---|---|
| 2019/0099780 | A1 | 4/2019 | Caillier et al. |
| 2020/0338591 | A1 | 10/2020 | Sakai et al. |
| 2023/0203323 | A1 | 6/2023 | Turgis et al. |

FOREIGN PATENT DOCUMENTS

| | | | | |
|---|---|---|---|---|
| CN | 110338634 | A | * 10/2019 | ............ A47J 27/002 |
| DE | 102014018464 | A1 | 6/2016 | |
| GB | 2328213 | B | 12/1999 | |
| JP | 2001181572 | A | 7/2001 | |
| JP | 2012052101 | A | 3/2012 | |
| JP | 2020006356 | A | 1/2020 | |
| JP | 2020189076 | A | 11/2020 | |
| KR | 20070117247 | A | 12/2007 | |
| KR | 20160037894 | A | 4/2016 | |
| KR | 101893581 | B1 | 8/2018 | |
| KR | 102025795 | B1 | 9/2019 | |
| KR | 102085595 | B1 | 3/2020 | |
| WO | 2017153698 | A1 | 9/2017 | |
| WO | 2019139138 | A1 | 7/2019 | |

OTHER PUBLICATIONS

International Search Report for Application No. PCT/FR2021/050880 mailed Sep. 20, 2021, pp. 1-3.

International Search Report for Application No. PCT/FR2021/050876 mailed Sep. 13, 2021, pp. 1-3.

Vanadur. Bismuth vanadate. Data Sheet retrieved https://admin.heubach.com/wp-contentluploads/heubach_a781b403939d44c581d3d8fd2dbae039.pdf on 03.02.2026 (Year: 2006).

Vanadur. Encapsulated Bismuth vanadate pigment. Data Sheet retrieved from https://www.sudarshan.com/products/vanadur-plus-yellow-901 0-c/ on Mar. 2, 2026 (Year: 2021).

* cited by examiner

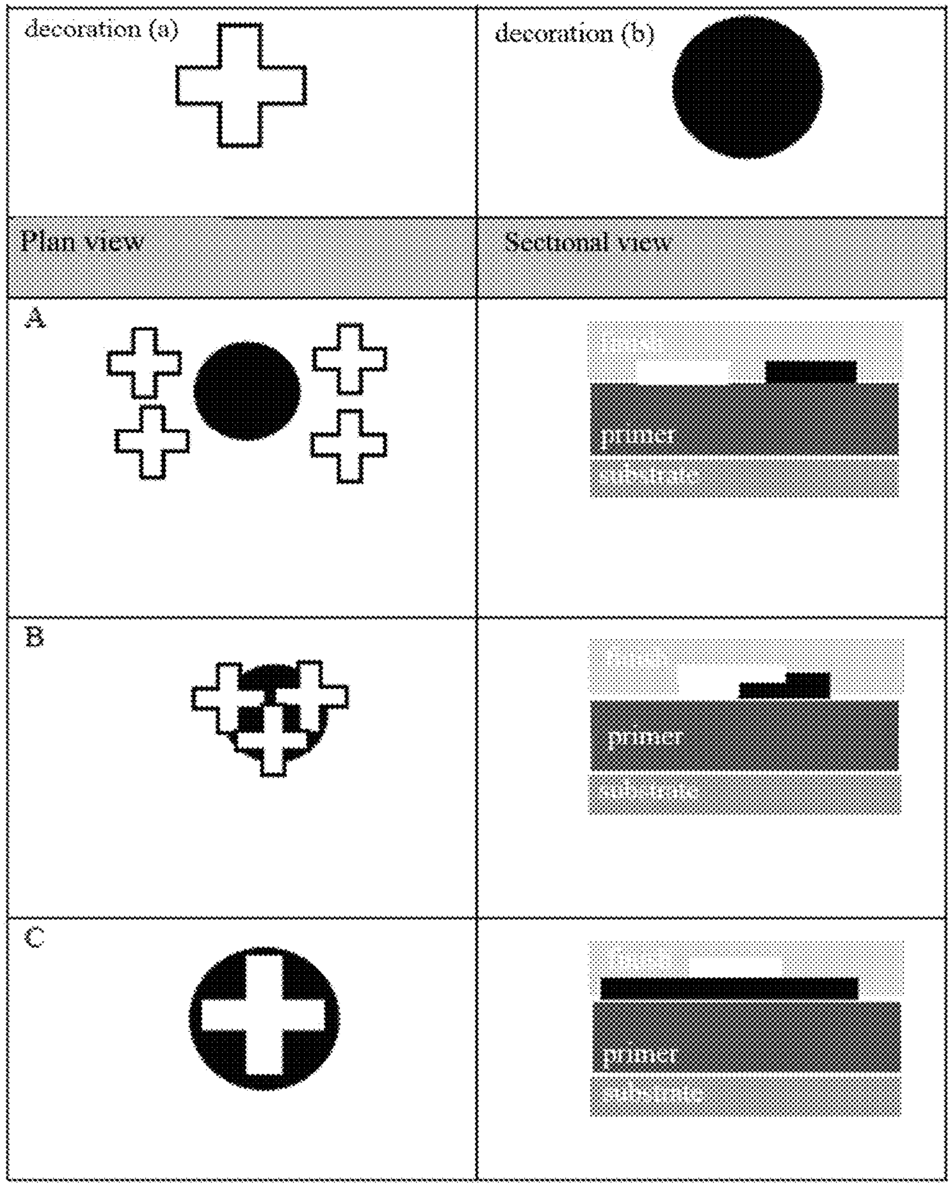
decoration (a)
decoration (b)
Plan view
Sectional view
A
primer
substrate
B
primer
C
primer

NON-STICK COATING

CROSS-REFERENCE TO RELATED APPLICATIONS

The present application is a national phase entry under 35 U.S.C. § 371 of International Application No. PCT/FR2021/050880, filed May 18, 2021, which claims priority from French Patent Application No. 2005092 filed May 19, 2020, all of which are incorporated herein by reference.

The invention concerns non-stick coatings for household articles, preferably cookware.

Non-stick household articles having a fluoropolymer-based coating currently consist of, among others, a PTFE type fluoropolymer but can also incorporate one or more bonding resins, such as PAI, PES, PAEK (polyaryletherketone), tannins, and/or organic additives such as acrylic derivatives.

The disadvantage of these resins and these additives is that they tend to partially degrade when PTFE is sintered and generate degradation by-products. These by-products thus created are often coloured and can degrade the colour of the coating, in particular from the upper coats to the primer coats, especially if these are light coloured. This colour change is visible, for example, when a light-coloured decoration is applied between the primer coats and the finish coat.

Household articles having a non-stick coating based on fluoropolymer or arising from sol-get chemistry also have a tendency to become stained with use, especially by absorption of oil, by-products of these oils arising from their thermal degradation or food stains in the case of cookware or degraded fibres in the case of clothing irons (fabric fibres) or straightening irons (hair fibres). This staining leads to a substantial darkening that can lead to the visual disappearance of the decorations.

The compound $BiVO_4$ is currently known as a photocatalyst making it possible to degrade organic compounds and therefore remove pollution from the atmosphere. However, to be active, this catalyst requires light. Moreover, the degradation kinetics are often very long (several hours).

More recently, it has been shown that $BiVO_4$ can be used to completely break down methylbenzene by combining a temperature reaction and under light irradiation. Nevertheless, it is not mentioned that $BiVO_4$ allows only a thermal degradation of methylbenzene (CN102008892).

Surprisingly, the inventors have observed that these colour change phenomena, generally at the end of a high-temperature manufacturing process or darkening following the absorption of fat by the non-stick coatings, can be resolved by adding $BiVO_4$ in one of the coats of the coating. The inventors have actually observed that a coat comprising $BiVO_4$ between the primer coats and a superposed light-coloured decoration prevents the accumulation in this light-coloured decoration of degradation by-products arising from the primer coats. $BiVO_4$ therefore catalyses the degradation of by-products arising from primer coats and migrating to the upper coats.

SUMMARY OF THE INVENTION

A first subject-matter of the invention concerns the use of $(Bi_{1-x}A_x)(V_{1-y}M_y)O_4$ in a non-stick coating for household articles, to catalyse the degradation of by-products arising from said coating during the manufacturing process thereof or the use of said household article characterised in that:

x is equal to 0 or x is between 0.001 and 0.999, y is equal to 0 or y is between 0.001 and 0.999, A and M are chosen in the group consisting of nitrogen, phosphorus, an alkali metal, an alkaline earth metal, a transition metal, a poor metal, a metalloid or a lanthanide, A and M are different from one another.

Definitions

"Room temperature" is understood to mean a temperature between 18 and 30° C.

Within the meaning of the present invention, "coat" should be understood to mean a continuous or discontinuous coat. A continuous coat (also called a monolithic coat) is a single whole forming a total solid colour completely covering the surface on which it is put down. A discontinuous coat (or non-monolithic coat) can comprise several parts so is not a single whole.

"Primer coat", "bonding coat" or "bonding primer" is understood to mean all the coats from the first coat applied directly to the support, also called substrate, (it is preferable that this coat adheres well to the support and provides all its mechanical properties to the coating: hardness, scratch resistance) to the last coat before the first decorative coat.

"Finish coat" or "finish" is understood to mean a continuous and transparent surface coat leaving the decorative coat perfectly visible while protecting it from mechanical damage and conferring its non-stick properties to the coating.

"Decoration" or "decorative coat" is understood to mean one or several continuous or discontinuous coats comprising a pigment composition. The decoration can be in the form of one or more patterns and one or more colours. A decoration is distinctly visible to the user with the naked eye and at a standard distance of use for the household article.

The expression "household article" should be understood to mean cookware and household appliances.

The household appliances in question here are intended to produce heat.

Within the meaning of the present invention, "cookware" should be understood to mean an object intended for cooking. For this purpose, it is intended to receive a heat treatment.

Within the meaning of the present invention, "object intended to receive a heat treatment" should be understood to mean an object which will be heated by an external heating system such as frying pans, saucepans, sauté pans, woks or barbecue grills, and which is able to transmit the calorific energy provided by this external heating system to a material or food in contact with said object.

Within the meaning of the present invention, "object intended to produce heat" should be understood to mean a heating object having its own heating system such as clothing irons, hair straighteners, steam generators, electric kettles or electrical appliances for cooking.

"Fluoropolymer-based coating" is understood to mean a coating which comprises one or more fluoropolymers in one or more of its coats.

Within the meaning of the present invention, "sol-get coating" is understood to mean a coating synthesised by the sol-get route from a solution based on precursors in the liquid phase, which is transformed into a solid by a set of chemical reactions (hydrolysis and condensation) at low temperature. The coating thus obtained can be either organo-mineral or entirely mineral.

Within the meaning of the present invention, "organo-mineral coating" is understood to mean a coating whose network is essentially inorganic, but which comprises organic groups, in particular because of the precursors used and the curing temperature of the coating.

Within the meaning of the present invention, "entirely mineral coating" is intended to mean a coating made up of an entirely inorganic material, free of any organic groups. Such a coating can also be obtained by the sol-get route with a curing temperature of at least 400° C., or from precursors of the tetraethoxysilane (TEOS) type with a curing temperature which may be less than 400° C.

"By-product arising from said coating during the manufacturing process thereof" is understood to mean chemical species arising from the degradation of coating compounds, in particular the degradation of these compounds due to heating during the manufacturing process. These chemical species are most often coloured chemical species which give an undesired colour to one of the coating coats, in particular light-coloured coats.

For example, it can be recalled that PAI resins partially degrade into strongly colouring amine monomers, that PES or PEEK resins partially degrade into phenolic monomers and that certain additives degrade into strongly colouring acrylic monomers during the manufacturing process.

"By-products arising from the coating during use" is understood to mean chemical species arising from the degradation of foods, such as fats, for example, in particular degradation due to heating during use.

It can be recalled, for example, that during the use of a household article, fats can break down into acrylamide, aromatic amines, nitrosamines, etc. which are strongly colouring.

FIGURES

FIG. 1: pattern distribution diagram in a two-decoration configuration. 1A=adjacent, non-overlapping patterns. 1B=partially overlapping patterns. 1C=overlapping patterns.

DETAILED DESCRIPTION

A first subject-matter of the invention concerns the use of $(Bi_{1-x}A_x)(V_{1-y}M_y)O_4$ in a non-stick coating for household articles to catalyse the degradation of by-products arising from said coating during the manufacturing process thereof or the use of said household article characterised in that:

- x is equal to 0 or x is between 0.001 and 0.999,
- y is equal to 0 or y is between 0.001 and 0.999,
- A and M are chosen in the group consisting of nitrogen, phosphorus, an alkali metal, an alkaline earth metal, a transition metal, a poor metal, a metalloid or a lanthanide,
- A and M are different from one another.

$(Bi_{1-x}A_x)(V_{1-y}M_y)O_4$ is added in one or more coats of said non-stick coating.

Preferably, the amount of $(Bi_{1-x}A_x)(V_{1-y}M_y)O_4$ in the or each of the coats into which it is added is comprised from 0.1 to 100% by weight relative to the weight of said coat in the dry state, preferably 0.2 to 80% by weight, more preferably 0.5 to 70% by weight. $(Bi_{1-x}A_x)(V_{1-y}M_y)O_4$ can be applied pure and continuously or discontinuously.

Advantageously, the $(Bi_{1-x}A_x)(V_{1-y}M_y)O_4$ compound is present in the form of particles consisting of the $(Bi_{1-x}A_x)(V_{1-y}M_y)O_4$ compound. "In the form of particles consisting of the $(Bi_{1-x}A_x)(V_{1-y}M_y)O_4$ compound" means that the particles are purely made of the $(Bi_{1-x}A_x)(V_{1-y}M_y)O_4$ compound. They are therefore not coated. Advantageously, they are rough.

During its manufacturing process, the coating can undergo high temperatures, for example comprised from 150 to 450° C.

During its use process, the coating can undergo high temperatures, for example comprised from 100 to 300° C., preferably from 150 to 250° C.

These high temperatures can be responsible for emitting by-products arising from said coating as well as by-products arising from foods and penetrating into the coating.

Preferably, the $(Bi_{1-x}A_x)(V_{1-y}M_y)O_4$ compound as defined above exhibits a monoclinic scheelite crystallographic form at room temperature.

Preferably, x and y are 0, i.e. the invention relates to the use of bismuth vanadate ($BiVO_4$). Advantageously, a $BiVO_4$ of monoclinic scheelite crystallographic form at room temperature is used.

Bismuth vanadate is an inorganic compound of yellow colour, of formula $BiVO_4$, widely used for its colour properties and for its absence of toxicity. Recorded in the Colour Index International database as Q. I. Pigment Yellow 184, it is especially sold by the companies Heubach (Vanadur®), BASF (Sicopal®), FERRO (Lysopac) or Bruchsaler Farbenfabrik (Brufasol®).

This compound has been the subject of many studies due to its intense colour and to its thermochromism. Many synthesis pathways can be considered for producing $BiVO_4$ nanoparticles, such as sol-gel synthesis, pyrolysis of precursors, hydrothermal and solvothermal syntheses and gas phase deposition. Hydrothermal synthesis can be complex from the mechanistic viewpoint due to the simultaneous formation of stable and unstable phases in the event of rapid heating in a pressurised autoclave. The abundance of phases and the complexity of the phase diagram of the products obtained by hydrothermal synthesis make it difficult to form and stabilise one or the other of the crystallographic phases.

The second, more commonly used synthesis pathway is a solid phase sintering method. It has the advantage of easily obtaining large-scale powders with a high degree of crystallinity at a low cost. $BiVO_4$ particles can thus be obtained by annealing a mixture of bismuth and vanadium salts via a high-temperature sintering process. The microstructure obtained (particle size, morphology, crystallinity) and optional doping elements may affect the band gap of $BiVO_4$, with as a consequence, a modification of its initial colour and/or thermochromism.

Given that A and M are different from one another, when:

- A is an alkali metal, it can be chosen from Li, Na, K, Rb and Cs,
- M is an alkali metal, it can be chosen from Li, Na, K, Rb and Cs,
- A is an alkaline-earth metal, it can be chosen from Be, Mg, Ca, Sr and Ba,
- M is an alkaline-earth metal, it can be chosen from Be, Mg, Ca, Sr and Ba,
- A is a transition metal, it can be chosen from Sc, Ti, Cr, Mn, Fe, Co, Ni, Cu, Y, Zr, Nb, Mo, Ru, Rh, Pd, Ag, Ta, W and Ir,
- M is a transition metal, it can be chosen from Sc, Ti, Cr, Mn, Fe, Co, Ni, Cu, Y, Zr, Nb, Mo, Ru, Rh, Pd, Ag, Ta, W and Ir,
- A is a poor metal, it can be chosen from Al, Zn, Ga, In and Sn,
- M is a poor metal, it can be chosen from Al, Zn, Ga, In and Sn,
- A is a metalloid, it can be chosen from B, Si, Ge and Sb,
- M is a metalloid, it can be chosen from B, Si, Ge and Sb, A is a lanthanide, it can be chosen from La, Ce, Pr, Nd, Pm, Sm, Eu, Gd, Tb, Dy, Ho, Er, Tm, Yb and Lu, M is a lanthanide, it can be chosen from La, Ce, Pr, Nd, Pm, Sm, Eu, Gd, Tb, Dy, Ho, Er, Tm, Yb and Lu.

Preferably, A and M different from one another are B and/or Mg.

Preferably, said coating comprises, in the following order from the face of the substrate of the household article on which it will be applied: one or more primer coats, optionally, one or more continuous or discontinuous decorative coats, and one or more finish coats.

Preferably, said coating comprises, in the following order from the face of the substrate of the household article: one or two primer coats, optionally a decorative coat and a finish coat.

In the case of a configuration with no decoration, $(Bi_{1-x}A_x)(V_{1-y}M_y)O_4$ is added in at least one primer coat and/or at least one finish coat. It is, for example, added in a primer coat to catalyse the degradation of the by-products arising from this coat during the manufacturing process of said coating and thus to protect the finish coats from a colour change due to the migration of degradation by-products into these coats. It is, for example, added into one or more finish coats to catalyse the degradation of the by-products arising from said finish coats or primer coats or by-products of food degradation, having migrated into these finish coats, arising from the use of said household article.

According to another embodiment, the coating according to the invention is an organo-mineral or entirely mineral sol-gel (SG) coating. These coatings synthesised by the sol-get pathway from precursors of the metal poly alkoxylate type have a hybrid network, generally of silica with grafted alkyl groups. A sol-gel (SG) composition comprises at least one colloidal metal oxide and at least one metal alkoxide type precursor.

The metal alkoxide is preferably a colloidal metal oxide chosen from colloidal silica and/or colloidal alumina.

A metal alkoxide is preferably used as a precursor chosen in the group consisting of:

the precursors corresponding to the general formula $M_1(OR_1)_n$, the precursors corresponding to the general formula $M_2(OR_2)_{(n-1)}R_2'$, and the precursors corresponding to the general formula $M_3(OR_3)_{(n-2)}R_3'_2$, with:

$R_1$, $R_2$, $R_3$ or $R_3'$ designating an alkyl group, $R_2'$ designating an alkyl or phenyl group, n being a whole number corresponding to the maximum valence of the metals $M_1$, $M_2$ or $M_3$, $M_1$, $M_2$ or $M_3$ designating a metal chosen from Si, Zr, Ti, Sn, Al, Ce, V, Nb, Hf, Mg or Ln.

Advantageously, the metal alkoxide of the sot-gel solution is an alkoxysilane.

Alkoxysilanes which can be used in the sol-gel solution of the method of the invention can particularly include methyltrimethoxysilane (MTMS), tetraethoxysilane (TEOS), methyltriethoxysilane (MTES), dimethyldimethoxysilane, and mixtures thereof.

Preferably, the alkoxysilanes MTES and TEOS will be used, because they have the advantage of not containing methoxy groups. Indeed, methoxy hydrolysis leads to the formation of methanol in the sol-get formulation, which, given its toxic class, requires additional precautions during application. In contrast, hydrolysis of ethoxy groups only generates ethanol, having a more favourable class and therefore less restrictive using requirements for the sol-get coating.

The formation of this sol-get coating consists of mixing an aqueous composition A comprising the colloidal metal oxide and a solution B comprising the metal alkoxide. The mixture is advantageously done in a ratio of 40 to 75% by weight of the aqueous composition relative to the weight of the so-get composition (A+B), so that the quantity of colloidal metal oxide represents 5 to 30% by weight of the sol-get composition (A+B) in the dry state.

Aqueous composition A can also comprise a solvent, in particular a solvent comprising at least one alcohol.

Aqueous composition A can also comprise at least one silicone oil.

Aqueous composition A can also comprise a pigment.

Aqueous composition A can also comprise a mineral filler.

Aqueous composition A can also comprise fumed silica, whose function is to regulate the viscosity of the sol-get composition and/or the gloss of the dry coating.

Aqueous composition A typically comprises for a primer coat:

i) 5 to 30% by weight relative to the total weight of aqueous composition A of at least one colloidal metal oxide;

ii) 0 to 20% by weight relative to the weight of composition A of a solvent comprising at least one alcohol;

iii) optionally, 0.05 to 3% by weight relative to the total weight of said aqueous composition A of at least one silicone oil;

iv) 5 to 30% of pigment;

v) 2 to 30% of mineral filler.

Aqueous composition A typically comprises for a finish coat:

i) 5 to 30% by weight relative to the total weight of aqueous composition A of at least one colloidal metal oxide;

ii) 0 to 20% by weight relative to the weight of composition A of a solvent comprising at least one alcohol;

iii) optionally, 0.05 to 3% by weight relative to the total weight of said aqueous composition A of at least one silicone oil;

iv) 0.1 to 1% of metallic glitter.

Solution B can also comprise a Bronsted or Lewis acid. Advantageously, the metal alkoxide precursor of solution B is mixed with an organic or mineral Lewis acid which represents from 0.01 to 10% by weight of the total weight of solution B.

Particular examples of acids usable for mixture with the metal alkoxide precursor are acetic acid, citric acid, ethyl acetoacetate, hydrochloric acid or formic acid.

Solution B can also comprise a solvent, in particular a solvent comprising at least one alcohol.

Solution B can also comprise at least one silicone oil.

Solution B can also comprise metallic glitter.

According to an advantageous embodiment of the process of the invention, solution B can comprise a mixture of one of the alkoxysilanes such as defined above and an aluminium alcoholate.

According to this sol-gel embodiment, the coating according to the invention can comprise, in this order, from the face of the substrate:

One or more SG primer coats,

A decoration over at least a part of the last primer coat comprising the $BiVO_4$ pigment compound such as defined above.

According to another embodiment, the coating according to the invention is a fluoropolymer-based coating.

The fluoropolymer(s) can be present in the form of powder or aqueous dispersion or mixtures thereof.

Advantageously, the fluoropolymer(s) can be chosen in the group comprising polytetrafluoroethylene (PTFE), copolymers of tetrafluoroethylene and perfluoropropyl vinyl ether (PFA), copolymers of tetrafluoroethylene and hexafluoropropene (FEP), polyvinylidene fluoride (PVDF), copolymers of tetrafluoroethylene and polymethyl vinyl ether (MVA), terpolymers of tetrafluoroethylene, polymethyl vinyl ether and fluoroalkyl vinyl ether (TFE/PMVE/FAVE), ethylene tetrafluoroethylene (ETFE) and mixtures thereof.

Advantageously, the fluoropolymer(s) can be chosen from polytetrafluoroethylene (PTFE), copolymers of tetrafluoroethylene and perfluoropropyl vinyl ether (PFA), copolymers of tetrafluoroethylene and hexafluoropropene (FEP), a mixture of PTFE and PFA (PTFE/PFA) and a mixture of PTFE and FEP (PTFE/FEP).

Preferably, the fluoropolymer(s) can represent from 10 to 99% by mass, preferably from 50 to 98% by mass of the total dry mass of the non-stick coating composition.

Preferably, said coating comprises one or more decorations.

Preferably, $(Bi_{1-x}A_x)(V_{1-y}M_y)O_4$ is then added into at least one of the decorations or into a primer coat, in a particularly preferred manner in at least one of the decorations or in the last primer coat onto which the decoration(s) will be applied.

According to a first embodiment, $(Bi_{1-x}A_x)(V_{1-y}M_y)O_4$ is added into a coat to catalyse the degradation of the by-products arising from this coat or the primer coats. For example, $(Bi_{1-x}A_x)(V_{1-y}M_y)O_4$ is added into a decoration to catalyse the degradation of the by-products arising from this decoration and the primer coats coming into contact with this decoration. According to a sub-embodiment, the $(Bi_{1-x}A_x)(V_{1-y}M_y)O_4$ compound is added into a coat both to catalyse the degradation of the by-products arising from this coat and the primer coats, and also as a pigment to colour said coat.

A yellow decoration can be considered, for example, comprising $(Bi_{1-x}A_x)(V_{1-y}M_y)O_4$, the $(Bi_{1-x}A_x)(V_{1-y}M_y)O_4$ being used both to give the decoration its yellow colour as well as to catalyse the degradation of the by-products arising from this decoration and from the primer coats and coming into contact with this decoration. This yellow decoration can be made up of $(Bi_{1-x}A_x)(V_{1-y}M_y)O_4$.

According to a second embodiment, $(Bi_{1-x}A_x)(V_{1-y}M_y)O_4$ is added into a coat to catalyse the degradation of the by-products arising from the coating coat onto which it is superposed. For example, $(Bi_{1-x}A_x)(V_{1-y}M_y)O_4$ is added into a coat applied under a decoration, for example a primer coat, to catalyse the degradation of by-products arising from these primer coats and thus protecting the decoration.

A $(Bi_{1-x}A_x)(V_{1-y}M_y)O_4$ decoration can be considered in the form of patterns and a white decoration in the form of different patterns overlapping the decoration containing $(Bi_{1-x}A_x)(V_{1-y}M_y)O_4$ (see FIG. 1C), $(Bi_{1-x}A_x)(V_{1-y}M_y)O_4$ being used to catalyse the degradation of the by-products arising from the primer coats and protecting the white decoration. "Overlapping coats" is understood to mean partially or completely superposed coats. These coats can be in the form of decoration with partially overlapping patterns, for example concentric disks.

The decorations can be applied by any method well known to the skilled person such as, for example, by screen printing or pad printing.

Advantageously, the article support can be plastic, metal, glass, ceramic or terracotta. Metal supports usable in the context of the present invention advantageously include supports of aluminium or aluminium alloy, anodised or not, or of polished, brushed or bead-blasted, sandblasted, chemically treated aluminium or aluminium alloy, or polished stainless steel, or cast iron or aluminium, or titanium or hammered or polished copper.

The primer coat(s) can comprise a bonding resin, especially when the substrate is mechanically treated.

Preferably, the bonding resin(s) is (are) chosen in the group consisting of polyamide imides (PAI), polyether imides (PEI), polyamides (PA), polyimides (PI), polyetherketones (PEK), polyetheretherketones (PEEK), polyaryletherketones (PAEK), polyethersulfones (PES), and polyphenylene sulfide (PPS), polybenzimidazoles (PBI), tannins.

Examples of household articles usable in the context of the present invention can notably include deep fryer bowls, fondue or raclette pans or pots, the bowl of a deep fryer or bread machine, the jar of a blender, the plates of a straightening iron (said coating is intended to cover the plates of said straightening iron) and the iron soleplates (said coating is intended to cover the soleplate of said iron).

Preferably, said household article is an article of cookware, preferably chosen in the group consisting of saucepan, frying pan, stew pot, wok, sauté pan, crepe maker, grill, plancha grill, raclette grill, marmite pot or casserole dish, and said coating is intended to come into contact with food.

In the fields of application considered for the present invention, an article to be heated of the cookware type or a heating article of the iron type is typically used in a range of temperatures comprised between 10° C. and 300° C.

The use according to the invention can make it possible to catalyse the degradation of the by-products arising from said coating during the sintering step of its manufacturing process.

EXAMPLES

Example 1: Process for Synthesising a $BiVO_4$ Compound Used According to the Invention Process 1.1

To a solution of bismuth nitrate (0.1 M) in 1 M nitric acid is added stoichiometrically a solution of ammonium vanadate (0.1 M) in 1 M nitric acid. The mixture is stirred overnight, filtered, washed with water and then dried. The powder is then annealed at 450° C. for 3 hours.

The bismuth vanadate is then obtained in the form of a bright yellow powder of monoclinic scheelite structure characterised by X-ray diffraction analysis.

The process takes place at pH<1 with no addition of alkaline agent.

Process 1.2

To a solution of bismuth nitrate (0.4 M) in 1 M nitric acid is added a stoichiometric quantity of sodium metavanadate in the powder form. The mixture is stirred for 2 hours at 80° C. The precipitate is then filtered and washed with water to obtain a yellow $BiVO_4$ powder in the monoclinic scheelite form. The powder is then annealed at 500° C. for 3 hours.

The process takes place at pH<1 with no addition of alkaline agent.

The monoclinic scheelite $BiVO_4$ thus has a $\Delta E=40$ between room temperature and 200° C.

Example 2: $BiVO_4$ Compounds Tested

The following $BiVO_4$ compounds have been tested and compared for their effect on the protection from a colour change of the coat in which they are added or an adjacent coat:

$BiVO_4$ of Example 1

$BiVO_4$ sold under the reference Sicopal® Yellow K1120FG (BASF)

Example 3: Formulations (a) Primer 1/Formula 1a

| Component | weight % wet formula | weight % dry film |
|---|---|---|
| fluorinated polymer aqueous dispersion | 24 | 60 |
| carbon black aqueous dispersion | 4 | 4 |
| colloidal silica | 16 | 20 |
| bonding resin solvent dispersion | 41 | 16 |
| additives (base, wetting agents, etc.) | 6 | — |
| Water | 9 | — |

(b) Primer 2/Formula 2a

| Component | weight % wet formula | weight % dry film |
|---|---|---|
| fluorinated polymer aqueous dispersion | 48 | 88 |
| carbon black aqueous dispersion | 5 | 4 |
| colloidal silica | 3 | 3 |
| bonding resin solvent dispersion | 19 | 5 |
| additives (base, wetting agents, etc.) | 12 | — |
| Water | 13 | — |

(c) Primer 2/Formula 2b

| Component | weight % wet formula | weight % dry film |
|---|---|---|
| fluorinated polymer aqueous dispersion | 48 | 87 |
| carbon black aqueous dispersion | 4 | 3 |
| pigment paste based on the $BiVO_4$ of Example 1 | 9 | 3 |
| colloidal silica | 3 | 3 |
| bonding resin solvent dispersion | 19 | 4 |
| additives (base, wetting agents, etc.) | 12 | — |
| Water | 5 | — |

(d) White Decoration 3/Formula 3a

| Component | weight % wet formula | weight % dry film |
|---|---|---|
| fluorinated polymer aqueous dispersion | 54 | 72 |
| pigment paste based on $TiO_2$ | 25 | 28 |
| propylene glycol | 10 | — |
| thickening agent | 2 | — |
| additives (base, wetting agents, etc.) | 2 | — |
| Water | 7 | — |

(e) White Decoration 3/Formula 3b

-continued

| Component | weight % wet formula | weight % dry film |
|---|---|---|
| fluorinated polymer aqueous dispersion | 54 | 74.3 |
| pigment paste based on $TiO_2$ | 18 | 24.8 |
| pigment paste based on the $BiVO_4$ of Example 1 | 0.7 | 1.0 |
| propylene glycol | 10 | — |
| thickening agent | 2 | — |
| additives (base, wetting agents, etc.) | 2.3 | — |
| Water | 13 | — |

(f) Yellow Decoration 3/Formula 3c

| Component | weight % wet formula | weight % dry film |
|---|---|---|
| fluorinated polymer aqueous dispersion | 54 | 72 |
| pigment paste based on the $BiVO_4$ of Example 1 | 25 | 28 |
| propylene glycol | 10 | — |
| thickening agent | 2 | — |
| additives (base, wetting agents, etc.) | 2 | — |
| Water | 7 | — |

(g) Yellow Decoration 3/Formula 3d

| Component | weight % wet formula | weight % dry film |
|---|---|---|
| fluorinated polymer aqueous dispersion | 54 | 72 |
| pigment paste based on Sicopal ® K1120FG | 25 | 28 |
| propylene glycol | 10 | — |
| thickening agent | 2 | — |
| additives (base, wetting agents, etc.) | 2 | — |
| Water | 7 | — |

(h) Finish 4

| Component | weight % wet formula | weight % dry film |
|---|---|---|
| fluorinated polymer aqueous dispersion | 93 | 99 |
| Glitter | 1 | 1 |
| additives (base, wetting agents, etc.) | 3 | — |
| ethylene glycol | 2 | — |
| Water | 1 | — |

Example 4: Configurations a. Configuration 1: Primer Coat 1 without $BiVO_4$, Primer Coat 2 with/without the $BiVO_4$ of Example 1 and White Decoration without $BiVO_4$ A primer coat 1 of Formula 1a is first deposited on the aluminium substrate. After drying, a primer coat 2 of formula 2b is coated onto primer coat 1. After drying, a white decoration 3 of formula 3a is deposited onto the primer coat 2. After drying, a finish coat of formula 4 is coated onto the primer coat 2 and the decoration. The article is then sintered at 430° C. for 11 minutes.

Appearance: the decoration remains white with L*a*b* values=83, 0.4, 12. The decoration is protected from a colour change during the process of manufacturing the coating by the $BiVO_4$ contained in the primer coat 2 applied under the decoration. The primer coat 2 containing $BiVO_4$ catalyses the degradation of the coloured degradation by-products preventing them from being trapped in the coating.

In contrast, the same configuration with the only difference that the primer coat 2 is of formula 2a (without $BiVO_4$), has the consequence that the decoration after sintering is not white but golden yellow with the L*a*b* values=70.8; 2.8;

14.8. Coloured degradation by-products migrate from the primer coats to the white decoration and to the finish coat.

b. Configuration 2: Two Primer Coats without $BiVO_4$, Decoration with/without $BiVO_4$ A primer coat 1 of Formula 1a is first deposited on the aluminium substrate. After drying, a primer coat 2 of formula 2a is coated onto the primer coat 1. After drying, a white decoration of formula 3b is deposited onto the primer coat 2. After drying, a finish coat of formula 4 is coated onto the primer coat 2 and the decoration. The article is then sintered at 430° C. for 11 minutes.

Appearance: the decoration remains white with L*a*b* values=83, 0.4, 12. The decoration is protected from a colour change during the process of manufacturing the coating by the $BiVO_4$ contained in this decoration. The $BiVO_4$ contained in the decoration catalyses the degradation of the by-products arising from the primer coats.

In contrast, the same configuration with the only difference that the decoration is white of formula 3a (without $BiVO_4$) shows that the white decoration changes colour (L*a*b* values=70.8; 2.8; 14.8).

The same configuration with the only difference that the decoration is yellow of formula 3c shows that the yellow decoration does not change colour (L*a*b* values=76.1; −5.9; 72.0). The decoration is protected from a colour change during the process of manufacturing the coating by the $BiVO_4$ contained in this decoration.

The same configuration with the only difference that the decoration is yellow of formula 3d shows that the yellow decoration changes colour: it is brown (L*a*b* values=56.4; 1; 42.2). The $BiVO_4$ pigment of formula 3d (Sicopal® K1120FG) is encapsulated, i.e., the $BiVO_4$ particles are covered. $BiVO_4$ then does not play its catalytic role since the encapsulation prevents it from contacting the degradation by-products.

c. Configuration 3: Two Primer Coats without $BiVO_4$, Yellow Decoration Containing the $BiVO_4$ of Example 1 and Second Decoration Superposed on the First A primer coat 1 of formula 1a is first deposited on the aluminium substrate. After drying, a primer coat 2 of formula 2a is coated onto the primer coat 1. After drying, a yellow decoration containing formula 3c is deposited onto the primer coat 2. After drying, a white decoration of formula 3a is deposited onto the preceding yellow decoration. After drying, a finish coat of formula 4 is coated onto the primer coat 2 and the decorations. The article is then sintered at 430° C. for 11 minutes.

Appearance: the decoration remains white with L*a*b* values=83.1, 0.4, 12.0. The white decoration is protected from a colour change during the process of manufacturing the coating by the $BiVO_4$ contained in the yellow decoration applied under the white decoration. The yellow decoration containing $BiVO_4$ catalyses the degradation of the coloured degradation by-products of the primer coats.

The same configuration with the only difference that the second decoration is yellow of formula 3d shows that the second yellow decoration does not change colour (L*a*b* values=75.5; 1.5; 72.5). The second yellow decoration is protected from a colour change during the process of manufacturing the coating by the $BiVO_4$ contained in the first decoration. The same configuration with the only difference that the first decoration is yellow of formula 3d shows that the second white decoration (of formula 3a) changes colour (L*a*b* values=53.9; 9.4; 27.1). The second white decoration is not protected from a colour change during the process of manufacturing the coating by the $BiVO_4$ contained in the first decoration.

The invention claimed is:

1. A method for catalysing degradation of by-products arising from a non-stick coating of a household article during a manufacturing process thereof or during use of the household article, the method comprising: adding $(Bi_{1-x}A_x)(V_{1-y}M_y)O_4$ to at least one coat of the non-stick coating, wherein:

x is equal to 0 or x is between 0.001 and 0.999;

y is equal to 0 or y is between 0.001 and 0.999;

A and M are at least one element selected from the group consisting of nitrogen, phosphorus, an alkali metal, an alkaline earth metal, a transition metal, a poor metal, a metalloid, and a lanthanide; and A and M are different from one another, and wherein $(Bi_{1-x}A_x)(V_{1-y}M_y)O_4$ is in a form of non-encapsulated particles.

2. The method according to claim 1, wherein x and y are 0.

3. The method according to claim 1, wherein an amount of the $(Bi_{1-x}A_x)(V_{1-y}M_y)O_4$ in each coat of the non-stick coating that it is added to is from 0.1 to 100% by weight relative to a weight of the coat in a dry state.

4. The method according to claim 1, wherein A and/or M is at least one alkali metal chosen from Li, Na, K, Rb and Cs.

5. The method according to claim 1, wherein A and/or M is at least one alkaline earth metal chosen from Be, Mg, Ca, Sr and Ba.

6. The method according to claim 1, wherein A and/or M is at least one transition metal chosen from Sc, Ti, Cr, Mn, Fe, Co, Ni, Cu, Y, Zr, Nb, Mo, Ru, Rh, Pd, Ag, Ta, W and Ir.

7. The method according to claim 1, wherein A and/or M is at least one poor metal chosen from Al, Zn, Ga, In and Sn.

8. The method according to claim 1, wherein A and/or M is at least one metalloid chosen from B, Si, Ge and Sb.

9. The method according to claim 1, wherein A and/or M is at least one lanthanide chosen from La, Ce, Pr, Nd, Pm, Sm, Eu, Gd, Tb, Dy, Ho, Er, Tm, Yb and Lu.

10. The method according to claim 1, wherein non-stick coating comprises, in the following order from a face of a substrate of the household article on which it is applied: one or more primer coats, and one or more finish coats.

11. The method according to claim 1, wherein non-stick coating is a fluoropolymer-based coating.

12. The method according to claim 11 wherein the fluoropolymer-based coating comprises at least one of polytetrafluoroethylene (PTFE), copolymers of tetrafluoroethylene and perfluoropropyl vinyl ether (PFA), copolymers of tetrafluoroethylene and hexafluoropropene (FEP), polyvinylidene fluoride (PVDF), copolymers of tetrafluoroethylene and polymethyl vinyl ether (MVA), terpolymers of tetrafluoroethylene, polymethyl vinyl ether and fluoroalkyl vinyl ether (TFE/PMVE/FAVE), and ethylene tetrafluoroethylene (ETFE), or mixtures thereof.

13. The method according to claim 1, wherein the $(Bi_{1-x}A_x)(V_{1-y}M_y)O_4$ is added into at least one coat of the non-stick coating to catalyse degradation of by-products arising from the at least one coat.

14. The method according to claim 13, wherein the non-stick coating comprises one or more decorations.

15. The method according to claim 14, wherein the $(Bi_{1-x}A_x)(V_{1-y}M_y)O_4$ is added into a decoration to catalyse degradation of by-products arising from the decoration and primer coats in contact with the decoration.

16. The method according to claim 1, wherein the $(Bi_{1-x}A_x)(V_{1-y}M_y)O_4$ is added into one or more finish coats of the non-stick coating to catalyse degradation of by-products arising from at least one of the finish coats or from primer coats or from food by-products, having migrated into at least one of the finish coats arising from use of the household article.

17. The method according to claim 1, wherein the $(Bi_{1-x}A_x)(V_{1-y}M_y)O_4$ is added into at least one coat of the non-stick coating to catalyse degradation of by-products arising from the non-stick coating during a sintering step of its manufacturing process.

18. The method according to claim 1, wherein said non-stick coating comprises, in the following order from a face of a substrate of the household article on which it is applied: one or more primer coats, one or more continuous or discontinuous decorative coats, and one or more finish coats.

* * * * *